S. S. CROCKER & A. WILCOX.
Iron Fence-Post.
No. 196,337. Patented Oct. 23, 1877.
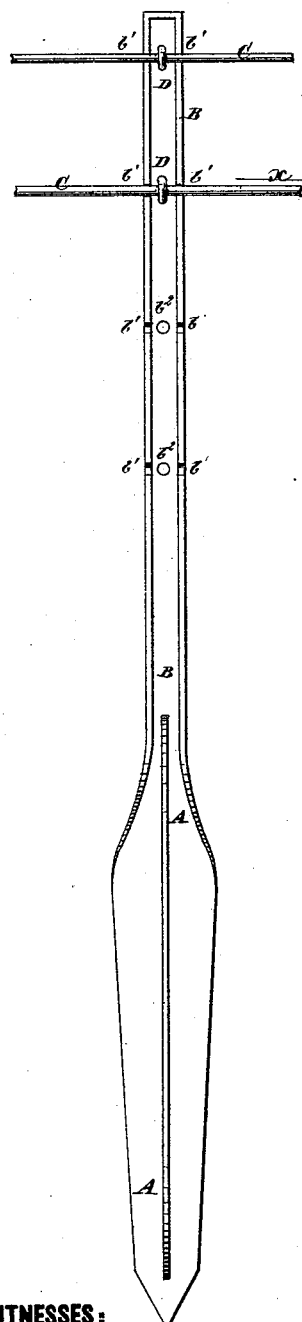
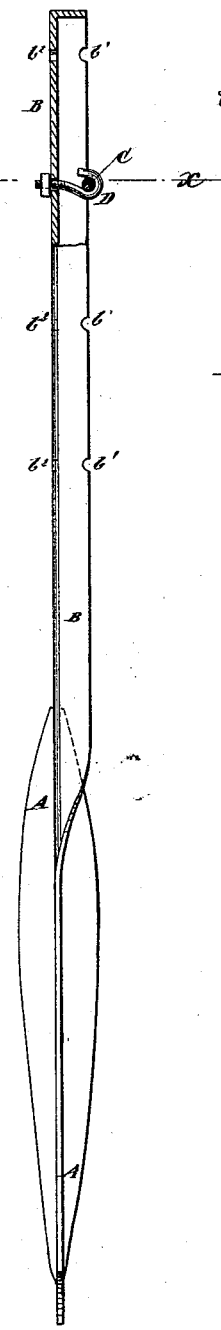
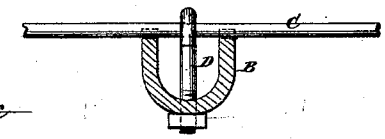
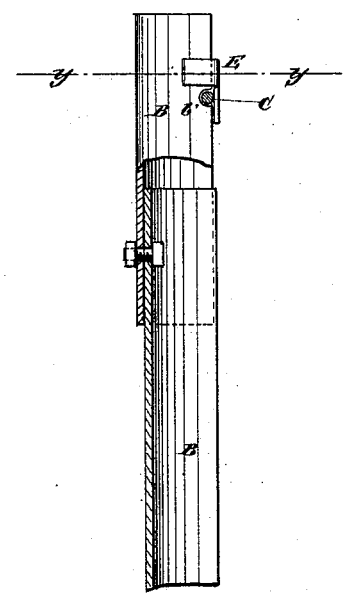
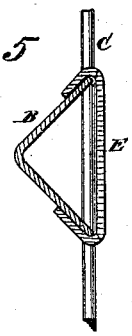

UNITED STATES PATENT OFFICE.

SILAS S. CROCKER AND ALBERT WILCOX, OF CLARENCE, IOWA.

IMPROVEMENT IN IRON FENCE-POSTS.

Specification forming part of Letters Patent No. 196,337, dated October 23, 1877; application filed July 9, 1877.

*To all whom it may concern:*

Be it known that we, SILAS S. CROCKER and ALBERT WILCOX, of Clarence, in the county of Cedar and State of Iowa, have invented a new and useful Improvement in Iron Fence-Posts, of which the following is a specification:

Figure 1 is a front view of our improved fence-post. Fig. 2 is a side view of the same, partly in section to show the construction. Fig. 3 is a cross-section of the same, taken through the line $x\,x$, Fig. 2. Fig. 4 is a side view of a modified form of the same, partly in section to show the construction. Fig. 5 is a cross-section of the same, taken through the line $y\,y$, Fig. 4.

Similar letters of reference indicate corresponding parts.

The object of this invention is to furnish an improved iron fence-post which shall be light and at the same time strong, which shall have a large surface to bear upon the soil to give it firmness and stability, and which may be firmly locked to the wire.

The invention will first be described in connection with the drawing, and then pointed out in the claim.

A is the lower part of the post, which is formed of four plates or webs meeting each other at right angles, so as to have the form of an equal-armed cross in its cross-section.

The lower end of the part A is made pointed, so that it may be readily driven into the ground. This construction gives a large surface to bear against the soil, so that it will be held firmly in position.

The upper part B of the post is made in U form, as shown in Figs. 1, 2, and 3, or in V form, as shown in Figs. 4 and 5, and has its upper end closed or capped, as shown in Figs. 1 and 2, so that it may be driven into the ground without danger of breaking it.

If desired, the post may be made in two parts, meeting, overlapping, and fitting upon each other just above the surface of the ground, as shown in Fig. 4, and secured to each other by one or more bolts. The front edges of the upper part B of the posts have notches $b^1$ formed in them to receive the wires C, and holes $b^2$ in their bends or angles to receive the hook-bolts D, by which the wires and posts are locked together. By this construction, by tightening the nut of the bolts D, the wires will be drawn into the hollow of the posts B, so that the said posts cannot change their positions upon the said wires. By this construction, also, any slack in the wires C may be taken up by screwing up the nuts of the bolts D, to draw the said wires C still farther into the cavities of the posts.

The wires C may also be secured in their notches $b^1$ by the lock-plate E, which crosses the open side of the posts B, and its ends are bent back upon the sides of the post, and have their lower parts cut away or notched, so that the middle part of the said plate may pass down over the wire C and keep it in its notches, while its end parts rest upon the said wire C at the sides of the posts. This device is especially adapted to the posts when made V-shaped.

The posts may be made of wrought-iron or of cast-iron, or partly of wrought-iron and partly of cast-iron, as may be desired.

We are aware that posts have been made of metal with flanged bases, and that wire rails have been secured to the posts by notches in the latter and screw-bolts; but by the use of a concave post, nut, and eyebolt, the slack in wire may readily be taken up without much labor and with a trifling expense; hence,

What we claim as new and of our invention is—

The combination of nuts, eyebolts, and concave posts to secure wire rails, as set forth.

SILAS S. CROCKER.
    ALBERT WILCOX.

Witnesses:
 GEO. E. WILCOX,
 ALBERT GREEN.